June 24, 1958  J. B. MASON  2,840,436
MULTI-VAT CHICKEN FRYER
Filed Feb. 25, 1955  2 Sheets-Sheet 1

INVENTOR.
Jesse B. Mason
BY
McMorrow, Berman & Davidson
Attorneys

June 24, 1958

J. B. MASON 2,840,436

MULTI-VAT CHICKEN FRYER

Filed Feb. 25, 1955

INVENTOR.
Jesse B. Mason
BY
McMorrow, Berman & Davidson
Attorneys

United States Patent Office 2,840,436
Patented June 24, 1958

2,840,436

MULTI-VAT CHICKEN FRYER

Jesse B. Mason, Cheyenne, Wyo.

Application February 25, 1955, Serial No. 490,476

1 Claim. (Cl. 312—284)

This invention relates to a chicken fryer designed for commercial operations, such as large restaurants, hotels, catering services, and the like.

In many large scale restaurant or related food preparation and supply operations, large quantities of chicken must be fried in a minimum of time, over a continuing period.

Under these circumstances, it is essential that means be provided that will permit the chicken to be speedily processed through the several stages or preparation, from the raw material to the completely fried end product, and it is further of importance that the processing of the chicken be carried out in an orderly, speedy manner, by a minimum number of workers. Speedy processing of the food in this manner obviously results in considerable savings as regards the labor and equipment used, and further, results in a marked increase in the income to be derived from the operation by reason of the fact that a great number of customers can be served in a minimum amount of time, thus speeding customer turnover and enabling an establishment to accommodate a greater number of customers in a shorter period of time than has heretofore been possible.

The main object of the present invention is to provide a commercial chicken fryer which will be particularly designed to accomplish the above stated results, and to this end, the fryer constituting the invention, summarized briefly, if of a multi-vat type, comprising a bank of compartments each of which is used for processing the chicken through a particular step. Thus, a first compartment can be used to receive the raw chicken, for searing and browning purposes. After being seared and browned, the chicken is transferred to a second compartment, in which the chicken is processed through a slow cooking step. A third compartment may also be used for the slow cooking step, if desired, and a last compartment is used as a storage and simmer cooker, the last compartment being deeper than the other compartments. As the chicken is transferred from one compartment to another, the compartment from which the chicken is transferred is available to receive an additional quantity, thus setting up the mass production chicken frying operation and resulting in the production of large quantities of fried chicken in a minimum period of time.

Another object of importance is to so design the multi-vat chicken fryer as to facilitate its assembly and disassembly, thus reducing considerably the cost of manufacture.

Still another object is to form the chicken fryer in such a manner as to permit the several component parts thereof to be easily lifted out of a suitable supporting frame, thus permitting a complete cleaning of each compartment independently of the remaining compartments, as well as a complete cleaning or maintenance of a suitable supporting frame.

Still another object is to provide, on each compartment, means facilitating the draining off of cooking grease, without requiring movement of the compartment from the supporting frame.

Yet another object is to provide an arrangement, in a bank of compartments used in a chicken fryer of the type referred to, wherein the several compartments in effect interlock, so as to hold the same in proper position on the associated supporting frame.

Other objects will appear from the following description, the claim appended thereto, and from the annexed drawing, in which like reference characters designate like parts throughout the several views, and wherein:

Figure 1:
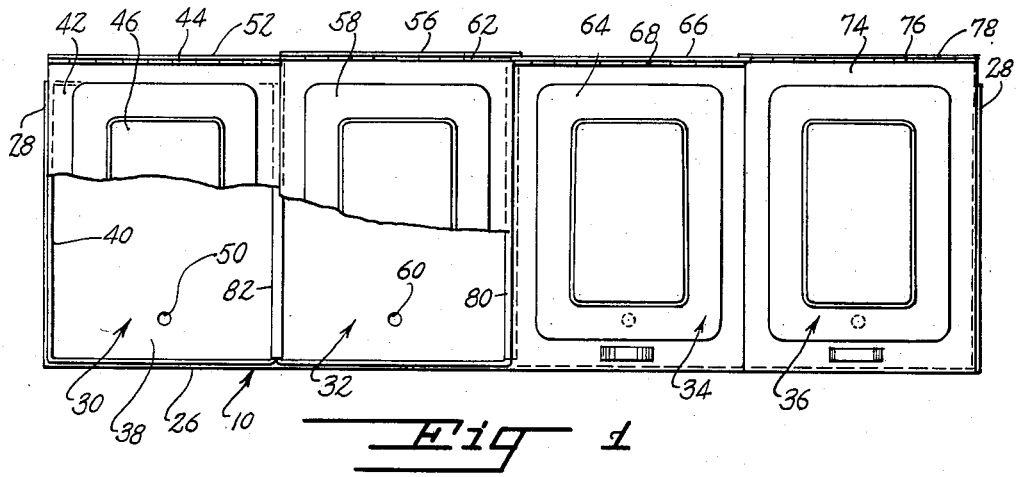
Figure 1 is a top plan view of the commercial chicken fryer, portions being broken away.

The commercial chicken fryer constituting the present invention may be considered as comprising two main components or assemblies, these being a compartment assembly generally designated 10 and including a plurality of separable compartments, and a rigid frame assembly generally designated 12 and supporting the compartment assembly in an elevated position above a suitable supporting surface.

Considering first the construction of the frame assembly 12, this is formed throughout of stainless steel, and it may be noted at this point that the remaining parts of the device are similarly formed, so far as all flat surfaces or panels thereof are concerned, of similar metal, thus to facilitate maintenance of the device in a sanitary condition.

The frame is composed of a plurality of angle members, arranged as vertically extending corner legs 14, connected at the front and rear of the chicken fryer by elongated lower longitudinal braces 16 extending from end to end of the structure. The corner legs are further connected, at the opposite ends of the structure, by lower cross braces 18.

Intermediate the corner legs, and disposed more closely to the legs at one end of the device than to the legs at the other end of the device, are vertically extending intermediate legs 20.

Extending between the intermediate legs 20 and the adjacent corner legs 14, at the front and rear of the structure, are relatively short, horizontally disposed storage compartment support elements 22 extending longitudinally of the structure. Extending between the intermediate legs 20 and the other corner legs 14 are elongated, longitudinally extending support elements 24, disposed at an elevation higher than that of the elements 22. Extending between the pairs of corner legs are upper cross braces 22, thus providing, at the top of the frame assembly, an open, horizontally disposed rectangular frame, one end of which is offset downwardly in the space between the intermediate legs 20 and the adjacent corner legs 14.

Extending across the front of the frame assembly, at the upper end thereof, is a front cover panel 26, said cover panel extending from end to end of the structure and being integral at its opposite ends with end cover panels 28.

In the illustrated example, a four compartment fryer is shown. It will be understood, in this connection, that a three compartment fryer might be used, and further, in some particularly large commercial operations, the fryer can have even more than four compartments. In the illustrated example, the several compartments have been generally designated at 30, 32, 34, 36 respectively. The compartment 30 is for searing and browning purposes, and is adapted to receive the chicken in a raw state. Compartment 32 receives the chicken in a second step of the operation, after the same has been seared and browned, and in this compartment, the chicken is put through a slow-cooking process. Compartment 34 is also used for a slow cooking process, two slow cooking compartments being used to one searing and browning compartment in view of the fact that the searing and browning is accomplished in a substantially shorter period of time than is required for slow cooking. The two slow cooking compartments, thus, receive the entire output of the single searing and browning compartment.

Compartment 36 is used for storage and simmering purposes, the chicken being placed in this compartment after being fully cooked, to await serving. Compartment 36 is substantially deeper than the remaining compartments, so as to hold a substantial quantity of chicken, receiving the entire output of the compartments 32, 34.

Considering the construction of the individual compartments, the compartment 30 has a flat bottom 38 integral with a relatively low, upstanding side wall 40. A cover 42 is provided with a piano hinge extending from side to side of the compartment, at the back end thereof, the hinge 44 being adapted to permit the cover 42 to be swung upwardly whenever desired. The cover may be provided with a domed portion 46, which in turn can, if desired, have a sight window formed therein. A handle 48 is provided at the front end of the cover to facilitate lifting thereof.

In the bottom 38 there is provided a valve 50 which is manually operable from a location below the compartment, to allow cooking greases to be drained off.

Rigid with the back wall of the compartment 30 is an upwardly extending, rearwardly offset splash pan 52 of L-shape.

Figure 2:
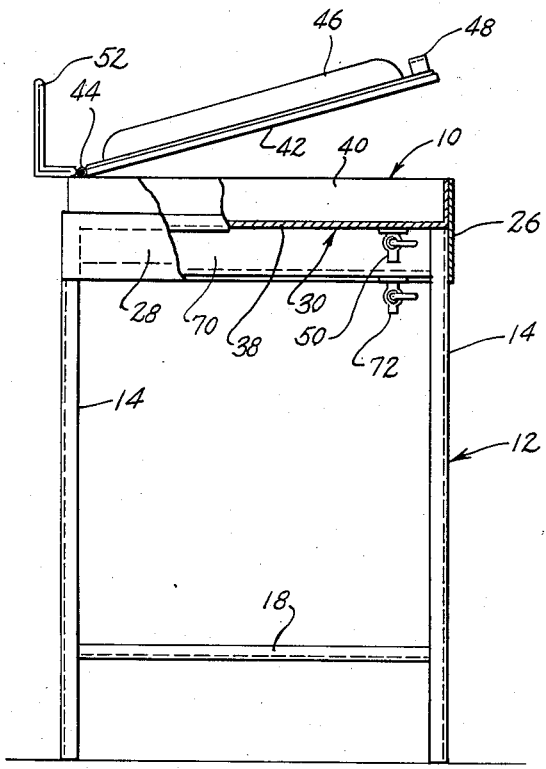
Figure 2 is an enlarged view of the fryer as seen from the left of Figure 1, portions being shown in section.
Figure 3:
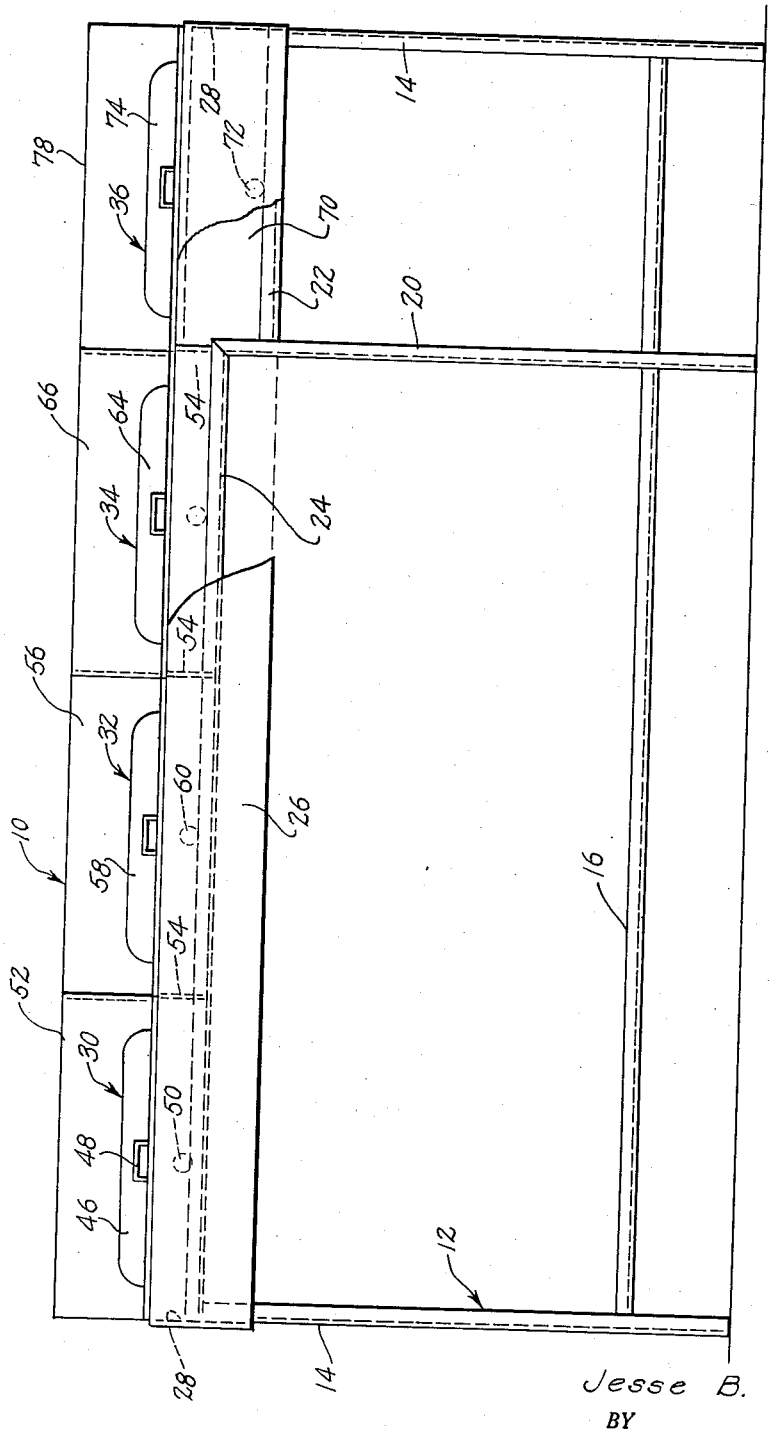
Figure 3 is a front elevational view in which parts have been broken away.

The splash pan, as shown in Figure 2, is of L-shaped or right-angular cross section, with a horizontal leg projecting forwardly from a vertical leg and connected directly to the back portion of the frame. The hinge connection of the associated cover extends along the front edge of the horizontal leg, in the plane of said horizontal leg. The cover has a flat marginal part connected to the hinge, and disposed in the plane of the horizontal leg in the closed portion of the cover. A dome portion 46 extends above said plane and as a result when the cover is swung upwardly, the dome portion will come to rest against the vertical leg of the splash pan to maintain the cover in its upwardly swung position. In this connection, as will be noted from Figure 2, the distance that the dome portion projects above the plane of the marginal part of the cover is approximately equal to the length of the horizontal leg of the splash pan, viewing the splash pan in cross section. Since the hinge is directly in front of the horizontal leg, this means that when the cover is swung upwardly, it can swing slightly beyond a fully vertical position with the dome portion coming to rest against the splash pan, thus to maintain the cover in its open position.

At uniformly spaced locations along the length thereof, the frame assembly is provided with dividing partitions 54, between which the several compartments are disposed. The partitions at their upper ends are formed with lips to provide support surfaces for the correspondingly lipped side edge portions of the several compartments.

Considering the construction of the compartment 32, this also has a splash pan 56 analogous to the splash pan 52, a domed cover 58, a valve drain 60, and a hinge 62. Compartment 34 has a similar cover 64, a splash pan 66, and a hinge 68, while the compartment 36 has a relatively high side wall 70, a valve drain opening 72 formed in its bottom, the bottom of the compartment 36 being offset downwardly below the bottoms of the remaining compartments, a domed cover 74, a hinge 76 for the cover, and a splash pan 78.

Positioned over the lipped, adjacent sides of the compartments to prevent food, grease, etc., from entering therebetween, are removable bars 80, 82, the side edges of the covers bearing thereagainst in the closed positions of the cover.

As shown in Figure 1, the hinges of alternating compartments are offset rearwardly relative to the hinges of the other compartments. Thus, in mounting the compartments on the supporting frame, one would first insert the compartments 32 and 36, these having the rearwardly offset hinges. These are supported upon the adjacent partitions 54, after which the compartments 30, 34 are placed directly upon the adjacent side edges of the compartments 32, 36. As a result, when it is desired to disassemble the device for cleaning or maintenance purposes, the compartments 30, 34 would first be removed, after which the compartments 32, 36 would be removed from the supporting frame. All the compartments are removable bodily from the supporting frame, leaving the interior of the frame wholly exposed for cleaning purposes; and further, each compartment can be completely cleaned separately from the others, thus facilitating the maintenance of the structure in a wholly sanitary condition.

It will be seen that in use, the device permits the commercial frying of chicken in great quantities. It will be noted that the device is not intended to be used as a deep fat cooker or the like, and is intended entirely for the speedy pan frying of chicken.

It is also an important characteristic of the device that comparatively little attention must be given to the same, considering the amount of chicken that can be fried therein in a relatively short period of time. Thus, a single employee can devote his attention to the several compartments, and after, for example, a quantity of chicken has been seared and browned in the compartment 30, and has been transferred to the compartment 32 or 34, a fresh supply of raw material can be placed in the compartment 30, while the chicken just transferred therefrom is being put through the slow cooking process. A continuous production of pan fried chicken thus results, permitting the feeding of a large number of persons in a comparatively short period of time.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

In a chicken fryer, a supporting frame; at least one compartment mounted in said frame and opening upwardly in the top of the frame, a splash pan secured to the frame at the top thereof and extending along the back end of the compartment, said splash pan being of a right-angular cross section, and including a vertical leg and a horizontal leg projecting forwardly from the lower edge of the vertical leg and fixedly secured to the frame; and a cover for said compartment having a hinge connection to the frame extending along the forward edge of the horizontal leg in the plane of said horizontal leg, said cover including a flat marginal part disposed in the plane of the horizontal leg in the closed position of the cover, and a central dome portion extending above said plane a distance substantially equal to the distance between the forward edge of the horizontal leg and juncture of said legs, whereby said cover may be swung upwardly to an open position slightly beyond the vertical with the dome portion engaged against the vertical leg of the splash pan to limit movement of the cover beyond said open position thereof, said dome portion having a flat top surface extending in area over the major part of the area of the dome portion, said top surface lying wholly in a plane parallel to the plane of the marginal part, said plane of the top surface being inclined from the vertical when in engagement with the splash pan, and engaging the splash pan along the top edge portion of the splash pan in the raised position of the cover.

References Cited in the file of this patent

UNITED STATES PATENTS

| | | | |
|---|---|---|---|
| D. 102,430 | Hoffsetter et al. | Dec. 22, | 1936 |
| 2,187,888 | Nachumsohn | Jan. 23, | 1940 |
| 2,205,160 | Trackwell | June 18, | 1940 |
| 2,290,360 | Rose | July 12, | 1942 |
| 2,564,990 | Parine | Aug. 21, | 1951 |
| 2,621,586 | Roney | Dec. 16, | 1952 |
| 2,679,841 | Muckler | June 1, | 1954 |